2,947,770
DIFORMYLBUTYL AND DIFORMYLCYCLO-PENTYL CONTAINING SILOXANES

Donald L. Bailey, Snyder, and William T. Black, Buffalo, N.Y., assignors to Union Carbide Corporation, a corporation of New York No Drawing. Filed May 13, 1955, Ser. No. 508,313

8 Claims. (Cl. 260—448.2)

This invention relates to new silicon-containing compositions of matter comprising organopolysiloxanes having organic substituents containing formyl groups and to processes for their preparation. More particularly, the invention relates to new silicon-containing compositions of matter comprising organopolysiloxanes having organic substituents, which include a diformylbutyl group or a diformylcyclopentyl group, bonded to one or more of the silicon atoms thereof through carbon to silicon linkages and to a process for their preparation.

The new organopolysiloxanes of the instant invention contain units which can be represented graphically by the following formula:

and includes polysiloxanes which can be represented graphically having the following formulae:

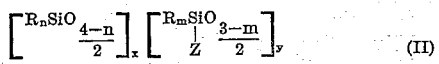

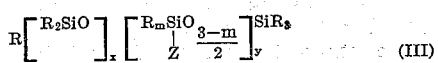

In the above formulae R represents an alkyl or an alkoxy group, Z represents either a diformylbutyl group or a diformylcyclopentyl group, $a$ has a value of at least 2 and preferably not more than 60, $m$ has a value of from 0 to 2, $n$ has a value of from 1 to 3, and $x$ and $y$ have values of at least 1 and preferably not more than 50 with the sum of $x+y$ not being less than 2 and preferably not more than 60. Examples of the alkyl groups which R can represent include methyl, ethyl, propyl and the like groups, while examples of the alkoxy groups which R may represent include methoxy, ethoxy, propoxy and the like groups.

The organopolysiloxanes of our invention can be prepared by various methods. They are preferably prepared by a process which includes reacting a polysiloxane containing at least one silicon-bonded cyclohex-3-enyl group or at least one silicon-bonded bicyclo(2.2.1)hept-5-enyl-2 group, but not more than one of such groups per silicon atom, with ozone to form a polysiloxane containing an ozonized cyclohex-3-enyl group or groups or an ozonized bicyclo(2.2.1)hept-5-enyl-2 group or groups. The organopolysiloxane containing such silicon-bonded ozonized group or groups is then hydrogenated with the formation of a polysiloxane containing one or more silicon-bonded 1,4-diformylbutyl groups or one or more silicon-bonded 2,4-diformylcyclopentyl groups. The overall reaction may be depicted by the following equation which shows the preparation of a trimethylsilyl endblocked dimethylpolysiloxane containing silicon-bonded 1,4-diformyl-2-butyl groups from a trimethylsilyl endblocked dimethylpolysiloxane containing silicon-bonded cyclohex-3-enyl groups.

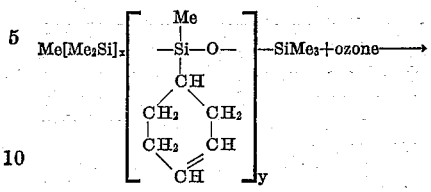

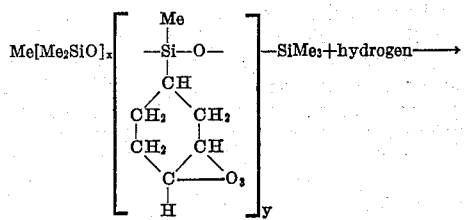

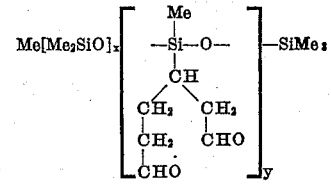

where $x$ and $y$ have values as shown above.

The process can be carried out by introducing ozone into a solution of a polysiloxane, containing silicon-bonded cyclohex-3-enyl groups or silicon-bonded bicyclo-(2.2.1)hept-5-enyl-2 groups, at low temperatures to form a polysiloxane containing ozonized cyclohex-3-enyl groups or ozonized bicyclo(2.2.1)hept-5-enyl-2 groups. Hydrogen is then introduced into a solution of the polysiloxane, containing such ozonized groups, at low temperatures, and in the presence of a catalyst to form a polysiloxane containing either silicon-bonded 1,4-diformylbutyl groups or silicon-bonded 2,4-diformylcyclopentyl groups respectively.

The starting materials employed in this embodiment of our invention are siloxane polymers and copolymers containing at least one silicon-bonded cyclohex-3-enyl group or at least one silicon-bonded bicyclo(2.2.1)hept-5-enyl-2 group. The subject starting materials can be prepared by various methods as for example by hydrolysis of hydrolyzable cyclohex-3-enylsilanes or by the cohydrolysis of such silanes with hydrolyzable alkylsilanes containing one, two or three hydrolyzable groups. Such hydrolysis processes are well known and include either the complete or partial hydrolysis of the hydrolyzable silanes and involve the use of either water, water-ice, water-solvent or water-solvent-ice hydrolysis mediums. The hydrolysis reaction that leads to the preparation of cyclohex-3-enylpolysiloxanes, which may or may not contain silicon-bonded alkyl or alkoxy groups, may be depicted by the following equation:

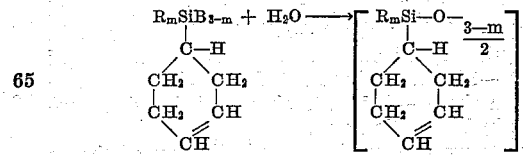

while the hydrolysis reaction which leads to the preparation of siloxane copolymers, may be depicted by the following equation:

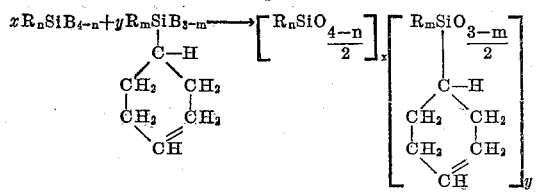

where R represents an alkyl or alkoxy group as shown above. B represents a hydrolyzable group such as an alkoxy group or a chlorine atom, $m$ has a value of from 0 to 2, $n$ has a value of from 1 to 3 and $x$ and $y$ have values of from 1 to 50 with the sum of $x+y$ not being less than 2 and preferably not more than 60.

Those alkoxy-containing organopolysiloxane starting materials employed in this embodiment of the invention can also be prepared by equilibration processes. By way of illustration a cyclohex-3-enylalkoxysilane, such as trimethoxycyclohex-3-enylsilane can be equilibrated with a cyclic siloxane, such as octamethylcyclotetrasiloxane by heating a mixture of the components in the presence of an alkaline catalyst to prepare a methoxy end-blocked dimethylpolysiloxane containing silicon-bonded cyclohex-3-enyl groups. The reaction may be depicted by the following equation:

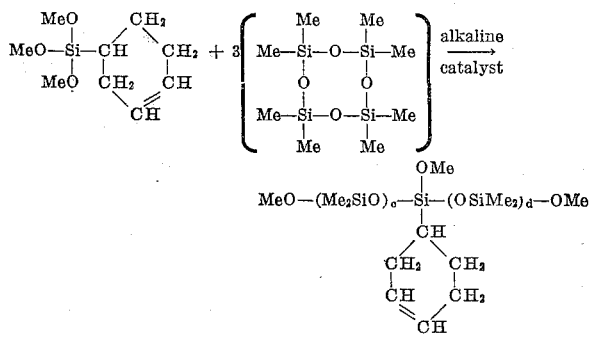

where $c+d$ is equal to 12.

It will be apparent that, while the above reactions disclose the preparation of organopolysiloxanes containing silicon-bonded cyclohex-3-enyl groups, such processes are also applicable to the preparations of organopolysiloxanes containing silicon-bonded bicyclo(2.2.1)hept-5-enyl-2 groups.

By the term low temperatures as hereinabove employed in connection with this embodiment of our invention we mean temperatures of about 50° C. and below. Temperatures above 50° C. favor undesirable side reactions according to our experience and are not preferred. By way of illustration in the ozonolysis step of the process we have noted a tendency of ozone to decompose and also a tendency of the starting materials to undergo an undesirable oxidation at temperatures above about 50° C. In addition, the hereinabove defined low temperatures are desirable in the hydrogenation of the ozonide group or groups, bonded to the silicon atom or atoms of the polysiloxane starting material, as at such temperatures the tendency of the ozonide to decompose rather than react with hydrogen is kept at a minimum. The temperatures employed are in some instances governed by the physical properties of the system, as for example the freezing point of the particular solvent present. We have found it preferable to employ temperatures of from about −80° C. to about 30° C., especially temperatures of from about −80° C. to about −30° C., when conducting the ozonolysis step of our process and temperatures of from about −30° C. to about 50° C. especially temperatures of from about −10° C. to about 10° C., when conducting the hydrogenation step.

As solvents we can employ practically any of the so called liquid organic solvents in which our starting polysiloxanes, which contain a cyclohex-3-enyl group or a bicyclo(2.2.1)hept-5-enyl-2 group bonded to at least one silicon atom thereof, as well as the resulting polysiloxane containing the corresponding ozonized groups is soluble and which is non-reactive under the conditions of our process with our starting polysiloxane, ozone, the resulting polysiloxane containing the ozonized groups, and hydrogen. Desirable for use are the alkanols such as methanol, ethanol propanol and the like. We may also employ as solvents in the process liquid organosilanes such as dimethyldiethoxysilane, diethyldiethoxysilane, dimethyldimethoxysilane diethyldimethoxysilane and the like.

We prefer to carry out the process of our invention under substantially anhydrous conditions, however, the presence of water is not objectionable, except when the starting polysiloxane contains, in addition to a cycolhex-3-enyl group or a bicyclo(2.2.1)hept-5-enyl-2 group, alkoxy groups bonded to the silicon atoms thereof. The presence of water can be objectionable in the latter instance if further condensation of the polysiloxane is not desired, since the alkoxy groups hydrolyze when in admixture with water.

In the hydrogenation step of our process any of the well known class of hydrogenation catalysts may be employed. We prefer to use such active hydrogenation catalysts, as platinum, palladium black, palladium oxide and Raney nickel. The amount of catalyst employed is not narrowly critical and from about 0.3% to about 3% by weight of the starting polysiloxane is preferred, but higher or lower amounts can be used with good results.

The new organopolysiloxanes of the present invention can also be prepared by the hydrolysis of an alkoxy (1,4-diformyl-2-butyl)silane or an alkoxy(2,4-diformylcyclopentyl)silane or by the cohydrolysis of a hydrolyzable alkylsilane with an alkoxy(1,4-diformyl-2-butyl)silane or an alkoxy(2,4-formylcyclopentyl)silane. Such hydrolysis and cohydrolysis processes can be conducted, either with or without the aid of a catalyst, by treating the above starting material or materials with a hydrolysis medium which can comprise either water, water-solvent, or water-solvent-ice admixtures. By way of illustration, diethyldiethoxysilane may be cohydrolyzed with ethyldiethoxy(1,4-diformyl-2-butyl)silane in any proportions, for example five parts of the diethyldiethoxysilane per part of ethyldiethoxy(1,4-diformyl-2-butyl)-silane, by adding a mixture thereof to a hydrolysis medium comprising an admixture of water, ethanol and ice. After hydrolysis is complete the water and ethanol may be removed by distillation and there remains a diethylpolysiloxane containing 1,4-diformyl-2-butyl groups bonded to various silicon atoms thereof.

We have found that the new organopolysiloxanes of our invention do not form completely stable solutions with alkanols. That is, if an organopolysiloxane having organic substituents containing formyl groups, bonded to one or more of the silicon atoms thereof, is dissolved in an alkanol and the solution permitted to stand for several hours, the formyl groups are converted to unreactive alkyl acetals. Consequently, since the preferred solvents employed in the ozonolysis and hydrogenation steps of the process are alkanols, it will be desirable to replace the alkanol with a solvent that is non-reactive with the formyl groups, as for instance an aromatic hydrocarbon, after hydrogenation is completed. According to our experience organopolysiloxanes having silicon-bonded organic substituents containing formyl groups within the scope of the present invention when in solution with aromatic hydrocarbons, as for example toluene or other solvents non-reactive therewith, can be stored for a period of several months without deterioration or decomposition.

*Example 1*

To a 2 liter, 3 necked flask fitted with a stirrer, dropping funnel, reflux condenser and a gas inlet tube were charged 4.12 moles of ethyltrichlorosilane and 0.83 mole of cyclohexenyltrichlorosilane. There was then slowly added, over a period of five hours with stirring, 7.6 moles of absolute ethanol. Hydrogen chloride evolved from the flask and the contents were continually sparged with nitrogen gas to remove the evolved hydrogen chloride. After the addition of ethanol there was then added 4.95 moles of water to partially hydrolyze the mixture together with 300 cc. of isopropyl ether which served as a solvent. When the nitrogen gas passing from the flask ceased to contain hydrogen chloride the reaction solution was neutralized with sodium bicarbonate and then filtered. A negative test for chloride content was obtained when a portion of the reaction solution was tested with silver nitrate. The solution was then heated to its boiling temperature, under a vacuum, to remove the isopropyl ether and water. Three hundred fifty grams of ethylpolysiloxane, containing silicon-bonded ethoxy groups and silicon-bonded cyclohexenyl groups was obtained. The reaction may be depicted by the following equation:

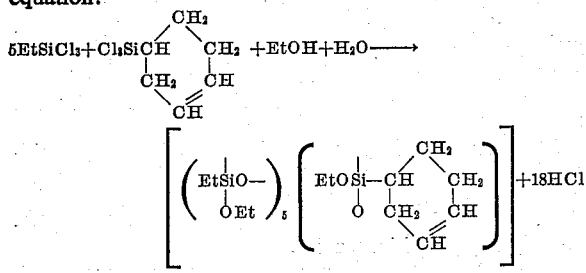

A solution comprising 30 grams of the ethylpolysiloxane product obtained above and 100 cc. of methanol was placed in a flask and the flask positioned within a bath cooled with solid carbon dioxide. The solution was permitted to cool to the temperature of the bath (approximately $-40°$ C.). Ozone, produced in the silent electric discharge at a concentration of about 4 mole percent in oxygen, was then bubbled into the solution until its appearance was noted in the off gas, as detected by bubbler filled with a solution of potassium iodide. Excess absorbed oxygen and ozone were removed from the reaction solution by sparging with nitrogen gas. The solution was then transferred to a hydrogenation flask containing 0.5 gram of palladium black and the flask positioned within a water-ice bath. When the solution had reached the temperature of the bath, hydrogen was introduced into the solution until the pressure in the flask reached about 3 atmospheres and the flask then slowly shaken. When the pressure in the flask ceased to drop the solution was removed therefrom and passed through a filter to separate the solution of ethylpolysiloxane, containing silicon-bonded ethoxy groups and silicon-bonded 1,4-diformyl-2-butyl groups, from the catalyst. There was then added to the solution 150 cc. of toluene to azeotrope with the water and methanol present. The water, methanol and toluene were removed from the ethylpoly-siloxane by a vacuum stripping operation. Twenty-seven grams of the ethylpolysiloxane containing silicon-bonded ethoxy groups and silicon-bonded 1,4-diformyl-2-butyl groups was obtained. The polysiloxane product when tested for aldehyde groups with Schiff's reagent gave a positive result. The overall reaction may be depicted as follows:

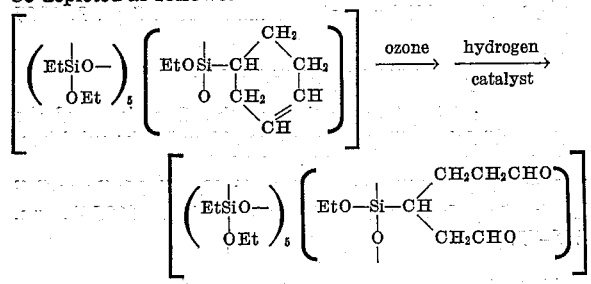

Example 2

To a flask were charged 0.1 mole dimethyldiethoxysilane and 0.01 mole of 2,4-di(formyl)cyclopentyltriethoxysilane. The contents of the flask were mixed and 100 cc. of water, containing about 0.25 cc. of concentrated hydrochloric acid, slowly added thereto while stirring. After 3 hours, 100 cc. of a solvent, isopropyl ether, was added to the reaction mixture and the solution obtained thereby neutralized with dilute aqueous sodium bicarbonate. The ether and aqueous layers were separated and the ether layer heated to its boiling temperature under a vacuum to remove the ether and traces of water therefrom. Dimethylpolysiloxane containing silicon-bonded 2,4-di(formyl)cyclopentyl groups was obtained as a viscous residue which gave a positive test for aldehyde content. The polysiloxane was transferred to a molecular still and distilled at 5 microns Hg pressure absolute to remove volatiles boiling below 100° C. The polysiloxane was then analyzed for element content and the following data obtained:

|   | Analysis (Wt. Percent) | Theory (Wt. Percent) [1] |
|---|---|---|
| C | 36.5 | 37.1 |
| H | 7.4 | 7.9 |
| Si | 27.3 | 32.8 |
| Aldehyde ___meg./g__ | 1.9 | 2.14 |

[1] For the polymer of the composition shown in the equation below.

The overall reaction may be depicted as follows:

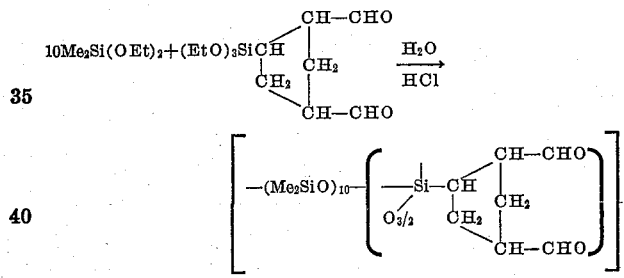

Example 3

To a flask were charged 45.6 grams of ethyldiethoxycyclohex-3-enylsilane and 296 grams of octamethylcyclotetrasiloxane together with 1.7 grams of potassium silanolate containing 3% by weight of potassium. The mixture was heated, to equilibrate the starting materials, for a period of three hours at a temperature of 150° C. After heating, the reaction mixture was allowed to cool and then passed through a filter to remove any solids present therein. To the mixture was added 10 cc. of acetic acid to neutralize the alkali and the solution then again filtered. The excess acetic acid was removed by vacuum stripping and the remaining product which comprised an ethoxy end-blocked dimethylsiloxane polymer having silicon-bonded cyclohex-3-enyl groups obtained. The reaction may be depicted by the following equation:

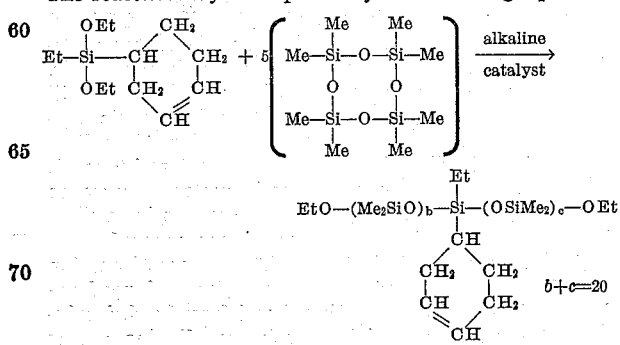

A solution comprising 50 grams of the above polymer in 100 cc. of dimethyldiethoxysilane was prepared and added to a flask positioned within a bath cooled with solid carbon dioxide. When the solution had cooled to the temperature of the bath (−78° C.), ozone, prepared in the silent electric discharge at a concentration of about 4 mole percent in oxygen, was bubbled into the solution at a rate of 1.46 millimoles of ozone per minute for 13 minutes after which time its appearance in the off gas was noted, as detected by a bubbler filled with a solution of potassium iodide. The amount of ozone that was not absorbed by the solution was determined by titration of free iodine in the off gas bubbler. By subtracting this amount of ozone from the total amount of ozone bubbled into the solution, it was found that a total of 17.6 millimoles of ozone was absorbed. Excess absorbed ozone and oxygen were removed from the solution by sparging with nitrogen gas. The solution was then transferred to a hydrogenation flask and the flask positioned within a water-ice bath. To the flask was added 0.5 gram of palladium black. When the temperature of the solution reached approximately 0° C. hydrogen was introduced into the flask until the pressure therein reached 50 pounds per square inch. When the pressure in the flask ceased to drop the solution was removed therefrom and passed through a filter to remove the catalyst. The dimethyldiethoxysiloxane solvent was removed from the solution by a vacuum stripping operation. There was recovered 36.2 grams of an ethoxy end-blocked dimethylsiloxane polymer containing silicon-bonded 1,4-diformyl-butyl groups. A positive test for aldehyde groups was obtained with Schiff's reagent. Analysis for element content produced the following:

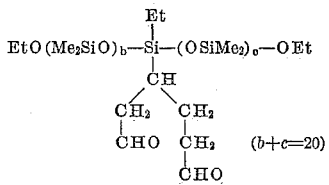

| | Analysis | Theory (Wt. Percent) |
|---|---|---|
| C | 34.1 | 35.8 |
| H | 8.2 | 8.2 |
| Si | 33.2 | 33.8 |
| OEt | 3.2 | 5.2 |

The new organopolysiloxanes of the present invention find particular use in the preparation of copolymers of organosiloxanes and organic condensation resins. Specifically, the new organopolysiloxanes by virtue of their formyl groups may be readily reacted with organic condensation resins containing reactive hydroxyl groups to form polysiloxane-containing copolymers. By way of illustration a phenol-formaldehyde condensation resin or a urea-formaldehyde condensation resin, both of which contain hydroxyl groups can be condensed with an organopolysiloxane of the present invention such as for example an ethyl end-blocked diethylpolysiloxane containing one or more silicon-bonded, 1,4-diformyl-2-butyl groups to form a diethylpolysiloxane phenol-formaldehyde or a diethylsiloxane urea-formaldehyde copolymer. The presence of the polysiloxane in the copolymer will upgrade the heat resistant properties of the organic condensation resins and thus widen their fields of applications to include those instances where heat resistance is important. Thus, such copolymeric materials may be employed as paints, coatings or wire enamels in applications where elevated temperatures are encountered.

The new organopolysiloxanes of the present invention when heated at elevated temperatures for prolonged periods of time become cross-linked and form hard, insoluble and infusible materials. Such cross-linking occurs through an aldol condensation. These cross-linked polymers can be employed in those applications where their properties as described above are required as for example in the preparation of cast solid articles.

What is claimed is:

1. An organopolysiloxane having the formula:

where each R represents an organic group taken from the class consisting of alkyl and alkoxy groups, Z represents an organic group taken from the class consisting of 1,4-diformyl-2-butyl and 2,4-diformylcyclopentyl groups, $m$ has a value of from 0 to 2, $n$ has a value of from 1 to 3, $x$ and $y$ have values of from 1 to 50 and the sum of $x+y$ having a value of from 2 to 60.

2. An organopolysiloxane having the formula:

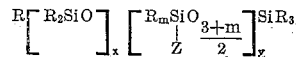

where each R represents an organic group taken from the class consisting of alkyl and alkoxy groups, Z represents an organic group taken from the class consisting of 1,4-diformyl-2-butyl and 2,4-diformylcyclopentyl groups, $m$ has a value of from 0 to 2, $x$ and $y$ have values of from 1 to 50 and the sum of $x+y$ having a value of from 2 to 60.

3. An organopolysiloxane whose pendant organosilicon-bonded substituents consist of 1,4-diformyl-2-butyl groups, alkyl groups and alkoxy groups, said organopolysiloxane containing not more than one 1,4-diformyl-2-butyl group per silicon atom.

4. An organopolysiloxane whose pendant organosilicon-bonded substituents consist of 2,4-diformylcyclopentyl groups, alkyl groups and alkoxy groups, said organopolysiloxane containing not more than one 2,4-diformylcyclopentyl group per silicon atom.

5. An organopolysiloxane whose pendant organosilicon-bonded substituents consist of 1,4-diformyl-2-butyl groups, ethyl groups and ethoxy groups, said organopolysiloxane containing not more than one 1,4-diformyl-2-butyl group per silicon atom.

6. An organopolysiloxane whose pendant organosilicon-bonded substituents consist of 2,4-diformylcyclopentyl groups, ethyl groups and ethoxy groups, said organopolysiloxane containing not more than one 2,4-diformylcyclopentyl group per silicon atom.

7. An organopolysiloxane whose pendant organosilicon-bonded substituents consist of 1,4-diformyl-2-butyl groups, methyl groups and ethoxy groups, said organopolysiloxane containing not more than one 1,4-diformyl-2-butyl group per silicon atom.

8. An organopolysiloxane whose pendant organosilicon-bonded substituents consist of 2,4-diformylcyclopentyl groups, methyl groups and ethoxy groups, said organopolysiloxane containing not more than one 2,4-diformylcyclopentyl group per silicon atom.

References Cited in the file of this patent

UNITED STATES PATENTS

| 2,415,389 | Hunter et al. | Feb. 4, 1947 |
| 2,486,162 | Hyde | Oct. 25, 1949 |
| 2,805,235 | Kiffer et al. | Sept. 3, 1957 |
| 2,805,236 | Kiffer et al. | Sept. 3, 1957 |

OTHER REFERENCES

Rochow: "An Introduction to the Chemistry of the Silicones," John Wiley & Sons, Inc., New York, publishers (1951), 2nd ed., pp. 69–70 and 79–82.

McGregor: "Silicones and their Uses," McGraw-Hill Book Co., Inc., New York, publishers (1954), pp. 265–79.

UNITED STATES PATENT OFFICE
CERTIFICATE OF CORRECTION

Patent No. 2,947,770                          August 2, 1960

Donald L. Bailey et al.

It is hereby certified that error appears in the above numbered patent requiring correction and that the said Letters Patent should read as corrected below.

Column 8, lines 6 to 8, the formula should appear as shown below instead of as in the patent:

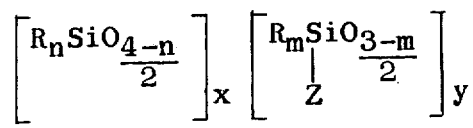

same column 8, lines 17 to 19, the formula should appear as shown below instead of as in the patent:

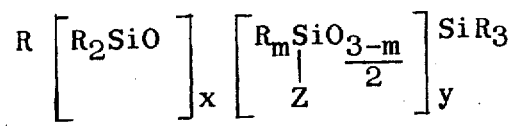

Signed and sealed this 24th day of April 1962.

(SEAL)
Attest:

ESTON G. JOHNSON
Attesting Officer

DAVID L. LADD
Commissioner of Patents